US005787528A

United States Patent [19]

Antinori

[11] Patent Number: 5,787,528

[45] Date of Patent: Aug. 4, 1998

[54] METHOD AND APPARATUS FOR PROVIDING BED RECALL FUNCTIONS

[76] Inventor: Santino Antinori, 3615 E. Lake Ave., Tampa, Fla. 33610

[21] Appl. No.: 885,131

[22] Filed: Jun. 30, 1997

Related U.S. Application Data

[63] Continuation of Ser. No. 539,104, Oct. 4, 1995, abandoned.

[51] Int. Cl.$^6$ .................... A61G 7/018; H04Q 7/00

[52] U.S. Cl. .................... 5/616; 5/600; 5/915; 318/16

[58] Field of Search .................... 318/16; 5/600, 5/613, 616, 617, 618, 619, 509.1, 915

[56] References Cited

U.S. PATENT DOCUMENTS

| | | | |
|---|---|---|---|
| 5,235,258 | 8/1993 | Schuerch | 318/16 |
| 5,461,738 | 10/1995 | Kimura et al. | 5/604 |
| 5,502,853 | 4/1996 | Singleton et al. | 5/609 |
| 5,523,664 | 6/1996 | Ogasawara | 318/590 |
| 5,542,138 | 8/1996 | Williams et al. | 5/658 |
| 5,544,376 | 8/1996 | Fromson | 5/618 |

*Primary Examiner*—Bentsu Ro
*Attorney, Agent, or Firm*—Diller, Ramik & Wight, PC

[57] ABSTRACT

A method and apparatus that allows a bed system to recall bed functions is accomplished by providing a bed controller with additional memory and processing steps. The additional memory is used to store current bed function data, desired bed function data, and recall bed function instructions. The additional processing, when executing the recall bed function instructions, compares the current bed function data with the desired bed function data. When the data does not match, the additional processing generates a function adjust signal which causes the bed to readjust itself to the desired function.

20 Claims, 2 Drawing Sheets

METHOD AND APPARATUS FOR PROVIDING BED RECALL FUNCTIONS

This application is a continuation of application Ser. No. 08/539,104, filed Oct. 4, 1995, now abandoned.

TECHNICAL FIELD OF THE INVENTION

This invention relates generally to beds and more particularly to providing recall bed functions.

BACKGROUND OF THE INVENTION

Beds are known to come in a variety of sizes and to include a frame and mattress. Some beds have mechanical frames that allow the head portion of the bed and/or the foot portion of the bed to be raised and lowered. Such beds are known as therapeutic beds, or hospital beds.

A therapeutic bed includes a mechanical frame, a frame controlling circuit, and a control input device. The control input device receives an input from the user of the bed and provides control signals to the frame controlling circuit. The frame controlling circuit, in turn, enables motors on the bed to achieve the desired function. For example, assume the user wishes to raise the head portion of the bed. In such a case, the user would press a "head up" button on the control input device, which would send a representative signal to the frame controlling circuit. Upon interpretation of the signal, the frame controlling circuit would produce a head motor signal that causes the head motor to raise the head of the bed. When the user releases the button, the intervening circuitry sensing this and causes the head motor to stop raising the head of the bed. A similar operation would be invoked to raise or lower the foot portion of the bed.

In addition to raising and lowering the head and foot of the therapeutic bed, the bed may also include massage motors within the frame and/or mattress. A user of the bed may initiate a foot or head massage by enabling the appropriate button on the control input device which causes the frame controlling circuit to provide control signals to the massage motors.

While therapeutic beds offers their users a wide variety of positions and message functions, execution of each function must be controlled by the user. From the example above, when the user wishes to raise the head of the bed, the user has to hold the "head up" button until the bed is in the desired position. If the bed position was moved, say it was completely lowered such that the bedding could be changed, the user would again have to hold the "head up" button until the bed is again in the desired position. Further, by having to re-execute the bed function in this manner, the user may not achieve the same bed position as he or she had before.

Therefore, a need exists for a method and apparatus that allows a user of a therapeutic bed to recall bed functions, such as bed positioning.

DETAILED DESCRIPTION OF A PREFERRED EMBODIMENT

Generally, the present invention provides a method and apparatus that allows a bed system to recall bed functions.

This is accomplished by providing a bed controller with additional memory and processing steps. The additional memory is used to store current bed function data, desired bed function data, and recall bed function instructions. The additional processing, when executing the recall bed function instructions, compares the current bed function data with the desired bed function data. When the data does not match, the additional processing generates a function adjust signal which causes the bed to readjust itself to the desired function. With such a method and apparatus, a user of the bed system is provided with the added convenience of being able to set and recall several bed functions, such as head position, foot position, and massage settings, with a single push of a button without having to hold the button and guessing whether this is the same setting as a previous setting.

Figure 1:
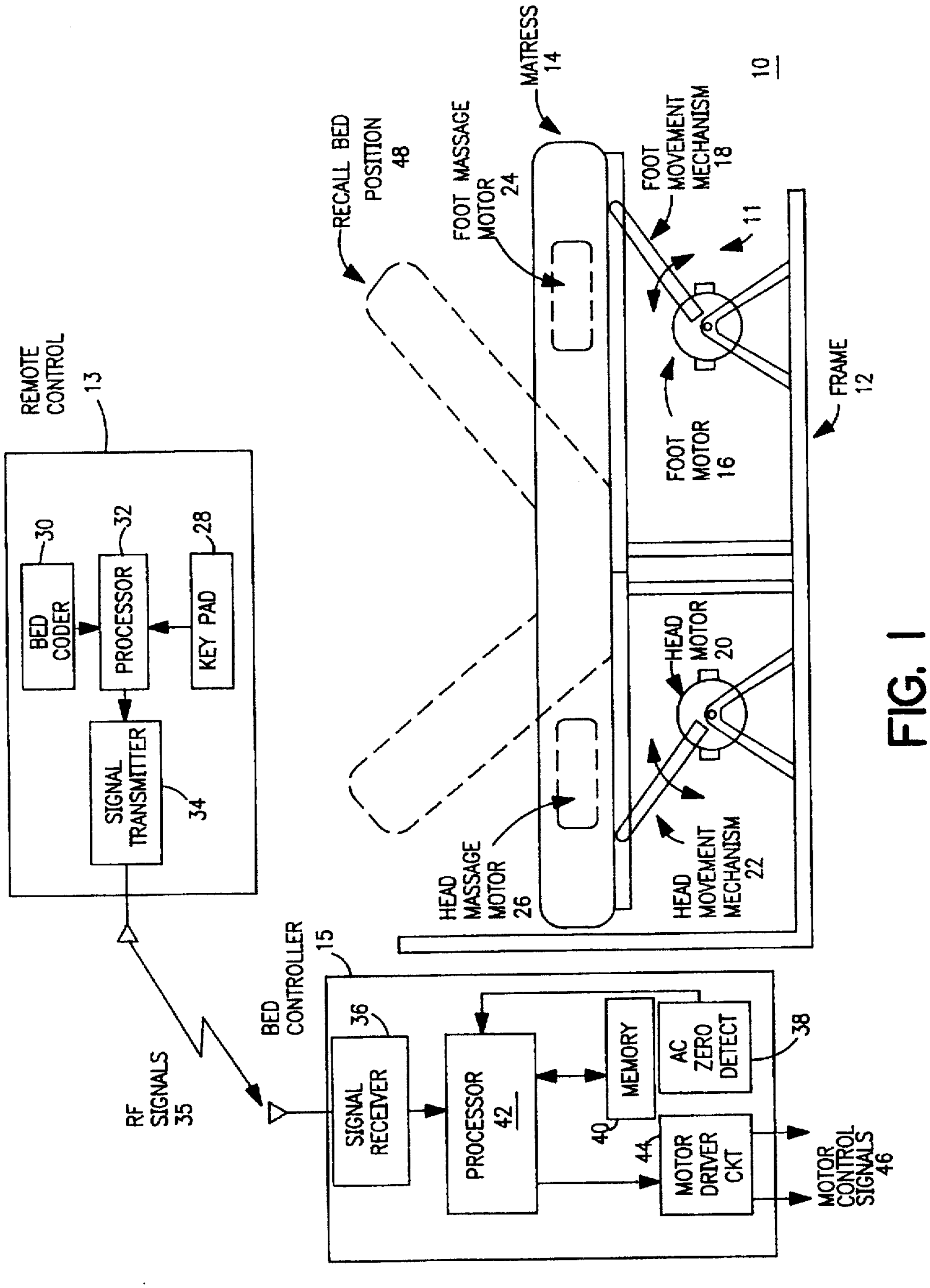
FIG. 1 illustrates a schematic block diagram of a bed system in accordance with the present invention.

FIG. 1 illustrates a bed system, or therapeutic bed, 10 that includes a bed 11, a remote controller 13, and a bed controller 15. The bed 11 includes a bed frame 12 and a mattress 14. The bed frame 12 includes a foot motor 16, a foot movement mechanism 18, a head motor 20, and a head movement mechanism 22. The head motor 20 is operably coupled to the head movement mechanism 22 and the bed controller 15. In general, the head motor 20, in response to head motor signals received from the bed controller 15, moves the head movement mechanism 22 such that the head of the bed is raised or lowered. One skilled in the art will readily appreciate that the head movement mechanism 22 may be any type of mechanical actuator that raises and lowers the head of the bed. In addition, the bed frame 12 may included more than one head motor to achieve the desired head movement function.

Like the head motor 20, the foot motor 16, in response to foot motor signals from the bed controller 15, moves the foot movement mechanism to achieve the desired foot position. Also like the head section, the foot movement mechanism 18 may be any type of mechanical actuator that raises and lowers the foot of the bed and the bed frame 12 may include more than one foot motor 16. Note that the foot motor 16 and the head motor 20 may be AC motors, as in the preferred embodiment, or DC motors.

The mattress 14 is shown to include a head massage motor 26 and a foot massage motor 24. Each of the motors 24, 26 is operably coupled to the bed controller 15 and is independently operated. In addition to independent operation, the massage motors 24, 26 may be placed in a cycling mode which increases the speed of one massage motor while decreasing the speed of the other. Further, each massage motor 24, 26 may have its rate adjusted to provide a different massage function. One skilled in the art will readily appreciate that the mattress may contain more massage motors or that the massage motors may be attached to the frame 12 instead of being embedded within the mattress 14.

The remote controller 13, which is used by a user of the bed system 10 to invoke the desired bed functions, includes a keypad 28, a processor 32, a bed coder 30, and a signal transmitter 34. The remote controller 13 may be directly coupled to the bed controller 15, or, as in the preferred embodiment, is coupled via a radio frequency (RF), or infrared (IR), transmission path.

The keypad 28 may be any type of push button array that at least provides the user with a button for lowering the head, raising the head, lowering the foot, raising the foot, setting a bed position, recalling the bed position, initiate head massage, and initiate foot massage. The keypad 28 may also include buttons that allow the head position to be individually set and recalled, the foot position to be individually set and recalled, and message functions to be set and recalled.

The bed coder 30, which may be a two position DIP switch, provides a unique bed code which differentiates one bed from another. Without the bed code, multiple beds could not be in the same transmission area because one remote controller would cause all the beds to be adjusted. The bed code ensures that only the addressed bed will be adjusted. One skilled in the art will readily appreciate that the bed coder 30 could be any type of device that stores a unique digital address, such as a Read Only Memory (ROM), hardwired switch, etc.

In operation, when the user depresses one of the buttons on the keypad 28, which initiates a desired bed function, the processor 32 determines the selected bed function. The processor 32, which may be a Motorola MC145026D, receives an input signal from the keypad and generates a unique digital word in response thereto, called a desired bed function code. The unique word is merged with the unique bed code produced by the bed coder 30. The resulting digital word is modulated by the signal transmitter 34 and transmitted to the bed controller 15. The signal transmitter 34 may use any type of modulation scheme such as frequency modulation, quadrature amplitude modulation, phase shift modulation, but, for the preferred embodiment, the signal transmitter 34 using amplitude modulation (AM) at 418 MHz.

The modulated RF signal 35 is received by the signal receiver 36 of the bed controller 15. The signal receiver 36 demodulates the modulated signal 35 to recapture the digital word. The processor 42 processes the word to recapture the bed code and the desired bed function code. If the bed code matches the bed code for the bed controller 15, the processor continues to process the desired bed function code. If, however, the recaptured bed code does not match the bed code for the bed controller 15, the processor 42 does not process the desired bed function code.

When the bed codes match, the processor 42, which may be a Motorola MC68HC05P4P, executes program instructions stored in memory 40 to determine the desired bed function. Upon determining the desired bed function, the processor 42 provides signals to the motor drive circuit 44, which converts the signals into motor control signals 46. The circuitry of the motor drive circuit 44 depends on whether the motors 16, 20, 24, 26 are AC motors or DC motors. For the preferred embodiment AC motors, the motor drive circuit 44 includes a separate drive circuit for each motor. Such circuits include a pair of opto-couplers to provide AC-DC isolation and a pair of triacs to gate the motors with the desired polarity.

The bed controller 15 also includes an AC zero crossing circuit 38 operably coupled to the processor 42. The AC zero crossing circuit 38 provides an input signal to the processor 42 every time the AC input voltage crosses zero potential. The processor 42 uses this information to enable the motors when the AC voltage is near zero such that inrush-currents and motor noise is minimized.

As previously mentioned, memory 40 stores program instructions that are performed by the processor 42 to achieve the desired bed function. Such program instructions are logically depicted in the flow diagram of FIG. 2. The process begins at steps 70 and 72 wherein a recall bed function is established and current data is established and maintained. Note that steps 70 and 72 may be sequentially interchanged without effecting the process operation. To establish the recall bed function, the process jumps to step

70-1, in which a bed position reference is generated. The bed position reference may be any position of the bed that is designated as the bed position reference. For purposes of convenience, the preferred embodiment has selected the bed position reference to be the lower most position. This can be accomplished by lowering the head and foot of the bed, which is shown at step 70-11. While the head and foot of the bed are moving, the head and foot motor currents are monitored, this is done at step 70-12. At step 70-13, the process determines whether the current for either the head or the foot motor has decreased. If not, the process repeats at step 70-11 until one of the currents decreases.

When one of the currents decreases, which indicates that the load has been removed from the motor, i.e., the bed has stopped moving, the process proceeds to step 70-14 wherein the bed position is stored as the bed reference position. Thus, when the bed is in its lower most position, i.e., flat, the reference position is set. Having determined the reference position, the process proceeds to step 70-2 wherein the current head data and current foot data are set equal to the bed reference position. Once the current data is set, the process proceeds to step 70-3 wherein the process determines whether a move head signal or a move foot signal has been received. As mentioned above, the user may initiate a move head or foot command by pressing the corresponding button on the keypad 28.

When a move bed signal is received, the process proceeds to step 72-1 where a move head and/or move foot signal is generated in response to the move bed signal. The move head signal or move foot signal will indicate whether the head, or foot, is being raised or lowered. The move head and/or foot signal is sent to the motor drive circuit which causes the appropriate motor to move the bed in the desired direction. As the bed is moving, the process updates the current head data and current foot data based on time of movement and direction of movement. For example, when the bed reference position was established, a head and foot register within memory 40, stored 0 for each. Using the head movement for the remainder of this example, when the head is raised, the processor monitors the time that the head motor was active. This time is stored as the new current head position data. Next, assume that the head of the bed is lowered, the processor monitors the time it took for the head motor to move the head of the bed into this new position. This time is then subtracted from the current head position data to establish new head positioning data. Thus, for each upward movement, the time it takes to reach that position is added to the current head positioning data, and for each downward movement, the time it takes to reach that position is subtracted from the current head positioning data.

At any time, the processor may receive a set recall message from the remote controller. This is depicted at step 70-4 and may simply be accomplished by the user pressing the set bed position function when the user has the bed in a position that he or she likes. This signal is transmitted to the processor, which, when the signal is received stores the current bed positioning data as the desired bed positioning data. This is depicted at step 70-5.

Returning to the main flow, the process proceeds to step 74 where it determines whether a recall bed function was received. Again the user can activate a recall bed function by pressing a single button on the remoter controller. The remote controller sends a representative signal to the bed controller which retrieves the desired bed function data and the current bed function data. This is shown in step 76. For the bed positioning recall, the retrieved data would be for head and foot positioning. Having retrieved the current and desired bed function data, the process proceeds to step 78, where it is determined whether the current bed function data matches the desired bed function data. If the data matches, the bed has attained the desired bed function, which is shown as step 80.

If, however, the current bed function data does not match the desired bed function data, the process proceeds to step 82, where a function adjust signal is created. For a bed position recall, the function adjust signal cause the head and foot of the bed to moved from its current position to the desired, or set, position. The function adjust signal may be positive —raise the portion of the bed— or negative —lower the portion of the bed—. As the bed is being adjusted, the process updates the current bed function data at step 84. The newly updated current bed function data is continually compared with the desired bed function data until they match. When they match, the function adjust signal is terminated and the bed has attained the desired bed function.

Figure 2:
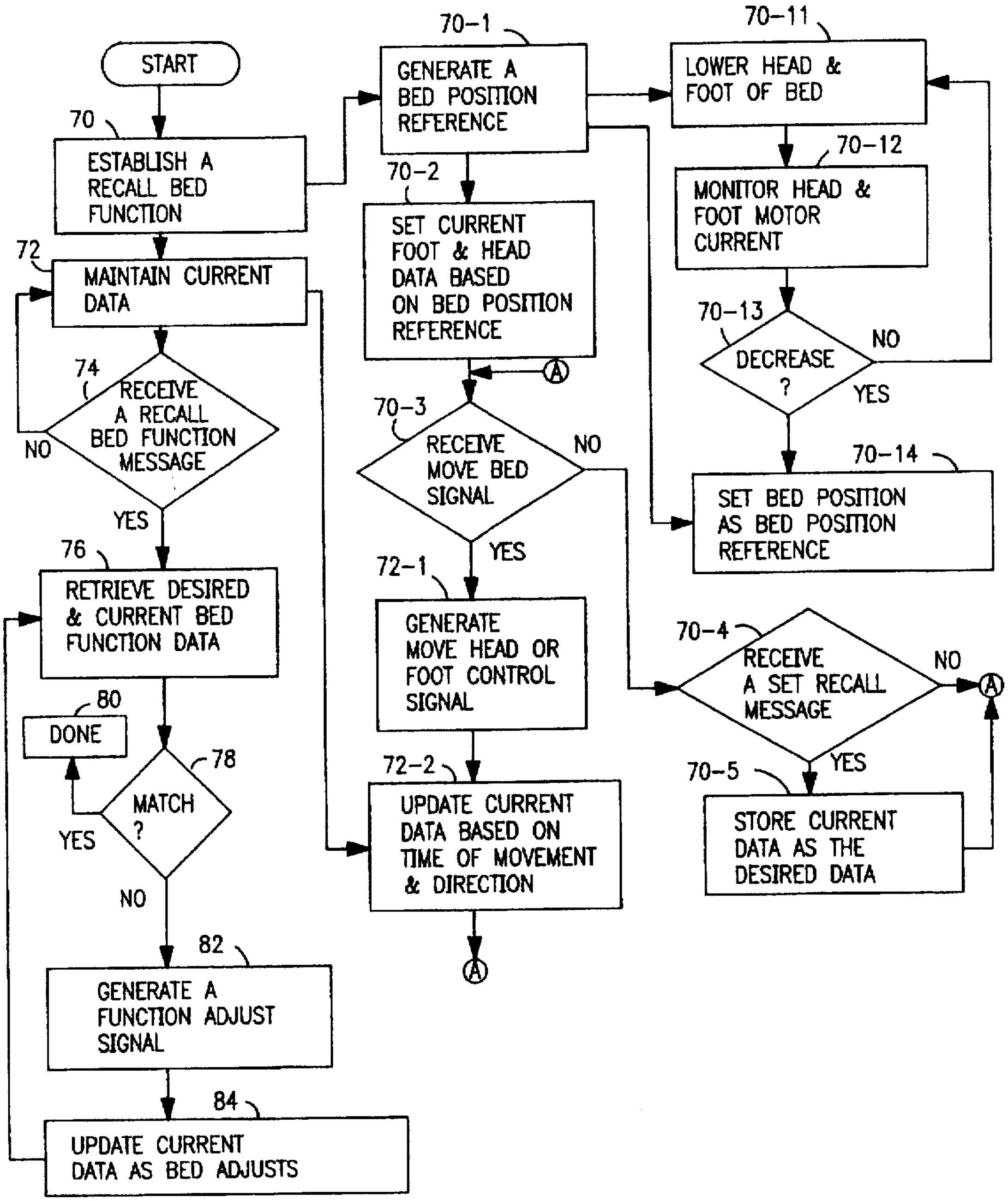
FIG. 2 illustrates a logic diagram that may be used to implement bed recall functions in accordance with the present invention.

As an example of the process of FIG. 2 assume that a particular bed position is to be stored and subsequently recalled. To establish the stored bed position, a bed reference position is established. The reference position is chosen to be the lower most position of the head and the foot of the bed, i.e., the head and the foot of the bed are parallel to the ground. This position is stored in a current head position register and a current foot position register which is updated each time the head or foot moves. When the head of the bed is moved, the time of movement is recorded as well as the direction of movement. This data is used to update the data in the current head position register. A similar process is used for the current foot position register.

When the user of the bed has the head and foot of the bed in a desired position (see recall bed position 48 of FIG. 1), the user pushes the set bed position button on the remoter controller. This provides a signal to the bed controller to store the current head and foot position data as the desired head and foot position data. As the bed is moved from this desired position, the current head and foot position data is updated to track the current bed position. Subsequently, the user desires to re-establish the stored bed position, to do this, the user presses the recall bed position button on the remote controller. This sends a signal to the bed controller, which causes the bed controller to compare the data in the current head and foot position registers with the desired head and foot position registers. When the data does not match, the bed controller produces move motor signals which cause the motors to move the bed into the desired, or recalled, bed position.

As an alternate example, assume that the user desired to establish a desired massage setting. In this case, the user sets the head and foot massage to the desired settings, which is recorded by the bed controller. At this point, the user pushes the set massage button on the remote controller. This causes a signal to be sent to the bed controller which stores this massage setting as the desired massage setting. As the massage settings are adjusted, the bed controller updates the current massage setting registers to reflect the change. When the user pushes the recall massage setting button, a signal is sent to the bed controller. In response to the signal, the bed controller compares the data within the current massage setting registers and the desired massage setting registers. When the data does not match, the bed controller generates massage motor adjust signals that cause the massage motors to provide the desired massage function.

The present invention provides a method and apparatus for providing bed function recall from a remote controller. With such a method and apparatus, the user can instantly re-establish a favorite bed function without the burdens of prior art systems. Thus, the present invention provides the user of such beds with greater functionality and ease of use.

What is claimed is:

1. A method for providing a recall bed function for a bed, the method comprising the steps of:

a) establishing a bed position reference by:

i) generating a move signal that causes a foot motor and a head motor to lower a foot and a head of the bed, respectively;

ii) monitoring currents of the foot motor and the head motor; and iii) when the currents of the foot motor and the head motor decreases, establishing this position of the bed as the bed reference position;

b) receiving a recall bed function message;

c) retrieving desired bed function data and current bed function data, which, for head or foot repositioning, are both derived from the bed position reference;

d) comparing the current bed function data with the desired bed function data; and e) when the current bed function data does not substantially match the desired bed function data, generating a function adjust signal based on a difference between the desired bed function data and the current bed function data.

2. The method of claim 1, wherein step (a) further comprises receiving the recall bed function message from an radio frequency remote controller.

3. The method of claim 1, wherein step (a) further comprises receiving a recall bed positioning message as the recall bed function message.

4. The method of claim 3, wherein step (b) further comprises retrieving current head positioning data and current foot positioning data as the current bed function data and retrieving desired head positioning data and desired foot positioning data as the desired bed function data.

5. The method of claim 4, wherein step (e) further comprises generating a head motor adjust signal when the current head positioning data does not substantially match the desired head positioning data and generating a foot motor adjust signal when the current foot positioning data does not substantially match the desired foot positioning data.

6. The method of claim 4, wherein the current head positioning data and the current foot positioning data are generating by:

setting the current foot positioning data and the current head positioning data based on the bed reference position;

when a move head signal or a move foot signal is received, monitoring time of movement and direction of movement; and updating the current foot positioning data when the move foot signal was received and updating the current head positioning data when the move head signal is received, wherein the updating is based on the time of movement and the direction of movement.

7. The method of claim 6, wherein the desired head positioning data and the desired foot positioning data are determined by:

receiving a set recall message;

storing the current head positioning data as the desired head positioning data; and storing the current foot positioning data as the desired foot positioning data.

8. The method of claim 1 further comprises the steps of:

f) updating the current bed function data as the bed adjusts in response to the function adjust signal; and g) repeating steps (d) through (f) until the current bed function data substantially matches the desired bed function data.

9. The method of claim 1, wherein step (a) further comprises receiving a recall massage message as the recall bed function message.

10. An apparatus for providing a recall bed function for a bed, the apparatus comprising:

signal receiver that operably receives a recall bed function message;

processor operably coupled to the signal receiver;

memory operably coupled to the processor, the memory stores desired bed function data, stores current bed function data, and stores program instructions that direct the processor, when the recall bed function message is received, to retrieve the desired bed function data and the current bed function data, and to generate a function adjust signal when the desired bed function data does not substantially match the current bed function data, motor drive circuit operably coupled to the processor, wherein the motor drive circuit provides a signal to control a motor of the bed based on the function adjust signal, such that the motor is driven to achieve a desired bed function; and an AC crossing circuit that provides an AC zero crossing signal to the processor, such that the processor provides the function adjust signal to the motor drive circuit to enable and disable the motor with minimal noise and minimal in-rush current.

11. The apparatus of claim 10, wherein the motor drive circuit further comprises a head motor drive section and a foot motor drive section, such that, when the recall bed function message is for positioning the bed in a pre-stored position, the head motor drive section provides a head signal to a head motor of the bed and the foot motor drive section provides a foot signal to a foot motor of the bed.

12. The apparatus of claim 10, wherein the motor drive circuit further comprises a foot massage motor drive section and a head massage motor drive section, such that, when the recall bed function is for a pre-stored massage function, the foot massage motor drive section provides a foot massage signal to a foot massage motor of the bed and the head massage motor drive section provides a head massage signal to a head massage motor of the bed.

13. A bed system comprising:

a bed that includes at least one motor for providing a bed function;

remote control that provides a control signal for invoking the bed function;

bed controller operably coupled to the bed, the bed controller includes:

signal receiver that operably receives the control signal;

processor operably coupled to the signal receiver;

memory operably coupled to the processor, the memory stores desired bed function data, stores current bed function data, and stores program instructions that direct the processor, when the control signal is received, to retrieve the desired bed function data and the current bed function data, and to generate a function adjust signal when the desired bed function data does not substantially match the current bed function data; wherein the function adjust signal causes the at least one motor to adjust the bed such that the bed performs the bed function, motor drive circuit operably coupled to the processor and to the at least one motor, wherein the motor drive circuit provides a signal to control the at least one motor based on the function adjust signal; and an AC crossing circuit that provides an AC zero crossing signal to the processor, such that the processor provides the function adjust signal to the motor drive circuit to enable and disable the at least one motor with minimal noise and minimal in-rush current.

14. The bed system of claim 13, wherein the remote control further comprises recall setting means for establishing the bed function, wherein the processor determines the desired bed function data in response to activation of the recall setting means.

15. The bed system of claim 13, wherein the bed further comprises a foot motor and a head motor as the at least one motor, wherein the bed function indicates positioning the bed based on the desired bed function data.

16. The bed system of claim 15, wherein the remote control further comprises head adjust means for providing a head move signal and foot adjust means for providing a foot move signal, wherein, when the head move signal is received, the processor generates a head command which causes the head motor to adjust the bed and, when the foot move signal is received, the processor generates a foot command which causes the foot motor to adjust the bed.

17. The bed system of claim 13, wherein the bed further comprises a foot massage motor and a head massage motor as the at least one motor, wherein the bed function indicates a massage setting of the bed.

18. The bed system of claim 17, wherein the remote control further comprises head massage means for providing a head massage signal and foot massage means for providing a foot massage signal, wherein, when the head massage signal is received, the processor generates a head massage motor signal which causes the head massage motor to provide the bed function as a head massage and, when the foot massage signal is received, the processor generates a foot massage motor signal which causes the foot massage motor to provide the bed function as a foot massage.

19. A method for providing a recall bed function for a bed, the method comprising the steps of:

a) receiving a recall bed function message;

b) retrieving desired bed function data and current bed function data;

c) comparing the current bed function data with the desired bed function data;

d) when the current bed function data does not substantially match the desired bed function data, generating a function adjust signal based on a difference between the desired bed function data and the current bed function data, step a) further includes receiving a recall bed positioning message as the recall bed function message, step b) further includes retrieving current head positioning data and current foot positioning data as the current bed function data and retrieving desired head positioning data and desired foot positioning data as the desired bed function data, step d) further includes generating a head motor adjust signal when the current head positioning data does not substantially match the desired head positioning data and generating a foot motor adjust signal when the current foot positioning data does not substantially match the desired foot positioning data, and e) establishing a bed position reference by:

i) generating a move signal that causes a foot motor and a head motor to lower the foot and head of the bed, respectively, and ii) monitoring currents of the foot motor and the head motor such that when the currents of the foot motor and the head motor decreases, establishing disposition of the bed as the bed position reference.

20. An apparatus for providing a recall bed function for a bed, the apparatus comprising:

a signal receiver that operably receives a recall bed function message;

a processor operably coupled to the signal receiver;

a memory operable coupled to the processor, the memory stores desired bed function data, stores current bed function data, and stores program instructions that direct the processor, when the recall bed function message is received, to retrieve the desired bed function data and the current bed function data, and to generate a function adjust signal when the desired bed function data does not substantially match the current bed function data, a motor drive circuit operably coupled to the processor, wherein the motor drive circuit provides a signal to control a motor of the bed based on the function adjust signal, such that the motor is driven to achieve a desired bed function, and an AC crossing circuit that provides an AC zero crossing signal to the processor, such that the processor provides the function adjust signal to the motor drive circuit to enable and disable the motor with minimal noise and minimal in-rush current.

* * * * *